US012680584B2

(12) United States Patent
Wittlinger et al.

(10) Patent No.: US 12,680,584 B2
(45) Date of Patent: Jul. 14, 2026

(54) SEMI-PERMANENT SHIM FOR HEAVY-DUTY VEHICLE DISC BRAKE SYSTEMS

(71) Applicant: Hendrickson USA, L.L.C., Schaumburg, IL (US)

(72) Inventors: Jeffrey R. Wittlinger, Uniontown, OH (US); Matthew P. Karich, Fairlawn, OH (US); Nathan A. Nicholas, Akron, OH (US)

(73) Assignee: Hendrickson USA, L.L.C., Schaumburg, IL (US)

( * ) Notice: Subject to any disclaimer, the term of this patent is extended or adjusted under 35 U.S.C. 154(b) by 383 days.

(21) Appl. No.: 18/533,318

(22) Filed: Dec. 8, 2023

(65) Prior Publication Data

US 2024/0240681 A1 Jul. 18, 2024

Related U.S. Application Data

(60) Provisional application No. 63/439,636, filed on Jan. 18, 2023.

(51) Int. Cl.
| | |
|---|---|
| *F16D 65/095* | (2006.01) |
| *F16D 65/00* | (2006.01) |
| *F16D 65/097* | (2006.01) |

(52) U.S. Cl.
CPC ....... *F16D 65/095* (2013.01); *F16D 65/0056* (2013.01); *F16D 65/0972* (2013.01)

(58) Field of Classification Search
CPC ............... F16D 65/095; F16D 65/0056; F16D 65/0972; F16D 65/097
See application file for complete search history.

(56) References Cited

U.S. PATENT DOCUMENTS

| | | | |
|---|---|---|---|
| 3,972,395 | A | 8/1976 | Jannasch et al. |
| 4,007,814 | A | 2/1977 | Berger |
| 5,284,227 | A | 2/1994 | Pelfrey |
| 5,735,368 | A | 4/1998 | Kobayashi et al. |
| 5,836,427 | A | 11/1998 | Nakajima et al. |

(Continued)

FOREIGN PATENT DOCUMENTS

| | | | | |
|---|---|---|---|---|
| DE | 102009007201 A1 | * | 10/2009 | ........... F16D 65/095 |
| EP | 1600653 A1 | * | 11/2005 | ......... F16D 65/0972 |

(Continued)

OTHER PUBLICATIONS

JP3094200B2 (Year: 2000).*
Workshop Manual—BPW-WH-BR TS2 35531901e.
BPW Flyer TS2 18291701e.

*Primary Examiner* — Thomas J Williams
(74) *Attorney, Agent, or Firm* — Dureska & Moore, LLC; David P. Dureska; Benjamin J. Chojnacki

(57) ABSTRACT

A shim for use with a component of a heavy-duty vehicle disc brake system, said shim comprising a pair of legs, a transition, and at least one tab. The pair of legs disposed upon and in contact with the component of the heavy-duty vehicle disc brake system. The transition extends between and is integrally formed with the pair of legs. The tab is connected to and extends away from the plane of one of the pair of legs. The tab also engages and is semi-permanently attached to the component.

10 Claims, 3 Drawing Sheets

(56)  References Cited

U.S. PATENT DOCUMENTS

| | | | | |
|---|---|---|---|---|
| 5,901,815 | A | * | 5/1999 | Kobayashi .......... F16D 65/0972 |
| | | | | 188/205 A |
| 6,116,384 | A | | 9/2000 | Matsumoto et al. |
| 6,189,659 | B1 | | 2/2001 | Doi et al. |
| 7,237,659 | B2 | | 7/2007 | Murayama |
| 8,511,440 | B2 | | 8/2013 | Kappagantu |
| 8,925,690 | B2 | | 1/2015 | Ogawa |
| 9,506,515 | B2 | | 11/2016 | White et al. |
| 9,568,055 | B2 | * | 2/2017 | Miller ................. F16D 65/0006 |
| 2004/0084255 | A1 | | 5/2004 | Fisher |
| 2022/0252120 | A1 | | 8/2022 | Konde et al. |
| 2024/0240681 | A1 | * | 7/2024 | Wittlinger ........... F16D 65/0056 |

FOREIGN PATENT DOCUMENTS

| | | | | | |
|---|---|---|---|---|---|
| FR | 3005128 | A1 | * | 10/2014 | .......... F16D 55/228 |
| JP | 3094200 | B2 | * | 10/2000 | |
| KR | 20230003899 | | | 1/2023 | |
| WO | WO-2010005008 | A1 | * | 1/2010 | ......... F16D 65/0972 |

* cited by examiner

SEMI-PERMANENT SHIM FOR HEAVY-DUTY VEHICLE DISC BRAKE SYSTEMS

CROSS-REFERENCE TO RELATED APPLICATION

This application claims the benefit of U.S. Provisional Patent Application No. 63/439,636, filed Jan. 18, 2023.

BACKGROUND OF THE INVENTION

Field of the Invention

The present invention relates generally to the art of braking systems for heavy-duty vehicles. In particular, the present invention relates to braking systems for heavy-duty vehicles that utilize disc brakes. More particularly, the invention is directed to a shim semi-permanently attached to a brake carrier or torque plate of a disc brake assembly for heavy-duty vehicles, the shim preventing or reducing fretting and wear of the carrier or torque plate caused by a brake pad and enabling error-proof installation and maintenance, thereby reducing maintenance and heavy-duty vehicle downtime and increasing the service-life of the disc brake assembly.

Background Art

The use of braking systems on heavy-duty vehicles is well-known. For the purposes of clarity and convenience, reference is made to a heavy-duty vehicle with the understanding that such reference includes trucks, tractor-trailers or semi-trailers, trailers, and the like. Common types of braking systems for heavy-duty vehicles typically include drum brake systems and disc brake systems.

Disc brake systems are generally incorporated into an axle/suspension system of the heavy-duty vehicle. More specifically, disc brake systems include a plurality of prior art disc brake assemblies, each operatively mounted on or adjacent a respective wheel end assembly of the heavy-duty vehicle. Each wheel end assembly, in turn, is rotatably mounted on a respective spindle fixedly connected to an end of an axle of the heavy-duty vehicle, as is known. A pair of suspension assemblies connects the axle to members of a frame or subframe of the heavy-duty vehicle, forming the axle/suspension system. For those heavy-duty vehicles that support a subframe, the subframe can be non-movable or movable, the latter being commonly referred to as a slider box, slider subframe, slider undercarriage, secondary slider frame, or bogey.

Each disc brake assembly typically includes a torque plate supporting a carrier, which, in turn, supports a caliper. The torque plate is rigidly connected, such as by welding, to the axle of the axle/suspension system on or adjacent the wheel end assembly of the heavy-duty vehicle. The carrier is attached to and supported by the torque plate, typically by mechanical fasteners, such as bolts. The caliper is slidably connected to the carrier by a guide pin assembly for transverse movement, as is known. Alternatively, disc brake assemblies may have a configuration that does not utilize a carrier. In such carrier-less configurations, the caliper is slidably connected by a guide pin assembly directly to the torque plate.

The caliper is also formed with a bore for receiving one or more pistons and openings for receiving an actuator. The actuator typically is a brake air chamber, or brake chamber, in fluid communication with a compressed air source to activate movement of the piston(s) through a sealed mechanical actuation mechanism. The sealed mechanical actuation mechanism amplifies the force between the air actuator and the piston(s). The caliper is also formed with an outboard pad seat disposed opposite the piston(s). A pair of opposing brake pads having friction material mounted on a backing plate are seated between respective leading and trailing abutments formed in the carrier, or torque plate and caliper, such that one of the pads is adjacent the piston(s) and the other pad is adjacent the outboard pad seat.

Each disc brake assembly also includes a rotor having a disc portion, a mounting portion, and a sleeve integrally formed with and extending between the disc portion and the mounting portion. The disc portion of the rotor is disposed between the pair of opposing brake pads such that the friction material of each pad faces a respective one of an inboard and an outboard surface of the disc portion. The mounting portion is adapted for mounting to a wheel hub of a respective wheel end assembly by mechanical fasteners, such as bolts, enabling the rotor to be rigidly connected to the wheel hub. The wheel hub, in turn, is rotatably mounted on the axle with one or more tire rims and tires mounted on the wheel hub, such that the rotor rotates about the axle of the heavy-duty vehicle as the tire rotates.

During operation, once the disc brake assembly is engaged, compressed air flows to the brake chamber and actuates the disc brake assembly, causing extension of the caliper piston(s) in an outboard direction, thereby forcing the brake pad adjacent the piston(s) outboardly against the inboard surface of the disc portion of the rotor. The force exerted by the piston(s) through the brake pad against the inboard surface of the disc portion of the rotor causes the caliper to slide along the guide pin assembly in an inboard direction, forcing the brake pad adjacent the outboard pad seat against the outboard surface of the disc portion. Contact between the brake pads and disc portion of the rotor causes contact between the brake pads and respective leading and trailing abutments, generating torque that is reacted and resisted indirectly by the torque plate through the carrier or directly by the torque plate in a carrier-less system. The torque plate reacts and resists the torque generated and maintains proper alignment of the caliper to ensure optimum operation of the components of the disc brake assembly. Contact of the friction material of the brake pads against the disc portion of the rotor slows and/or stops rotation of the heavy-duty vehicle wheel.

However, vibration of the brake pads within the carrier caused by movement of the suspension during operation of the heavy-duty vehicle and/or contact between the brake pads and the leading and trailing abutments during actuation of the disc brake assembly could potentially cause fretting and/or wear of the carrier or torque plate, leading to additional movement and/or vibration of the brake pads within the pad seats, which creates a hammering effect and further accelerates fretting and wear, thereby potentially causing damage to and/or shortening the service-life of the carrier or torque plate and increasing maintenance and heavy-duty vehicle downtime. As a result, some disc brake assemblies have incorporated prior art shims that are designed to be replaceably inserted into the carrier or torque plate. More specifically, prior art shims are typically installed on the carrier, or torque plate in a carrier-less system, such that they are disposed between a portion of the brake pads and the leading and trailing abutments such that during actuation contact occurs between the prior art shims and brake pads. Thus, prior art shims act as sacrificial wear components that may be removed and replaced at regular intervals, preventing or eliminating deleterious effects of braking on the pad seat and carrier, or torque plate in a carrier-less system.

Prior art shims, while performing adequately, have certain disadvantages, drawbacks, and limitations. For example, during routine maintenance of disc brake assemblies, replacement of prior art shims may potentially be omitted, resulting in additional movement and/or vibration of the brake pads within the pad seats, which creates a hammering effect leading to accelerated fretting and wear, thereby potentially causing damage to and/or shortening the service-life of the carrier or torque plate and increasing maintenance and heavy-duty vehicle downtime. In addition, in the event the prior art shims are missing, the design of such shims does not provide any indication as to whether the shims were tampered with and omitted or merely displaced by interactions between components of the disc brake assembly.

Thus, there is a need in the art for a shim for heavy-duty vehicle disc brake assemblies that is disposed between the brake pads and the leading and trailing abutments of the pad seat to reduce or eliminate fretting and/or wear of the carrier or torque plate and is semi-permanently attached to the carrier or torque plate to avoid omission and provide an indication of tampering.

SUMMARY OF THE INVENTION

Objectives of the present invention include providing a shim for heavy-duty vehicle disc brake assemblies that eliminates fretting and/or wear of the carrier or torque plate.

A further objective of the present invention is to provide a shim for heavy-duty vehicle disc brake assemblies that prevents its omission from the carrier and/or torque plate.

Yet another objective of the present invention is to provide a shim for heavy-duty vehicle disc brake assemblies that provides an indication that the shim has been tampered with or removed.

These objectives and advantages are obtained by the shim for use with a component of a heavy-duty vehicle disc brake system, according to the present invention, the shim comprising a pair of legs, a transition, and at least one tab. The pair of legs is disposed upon and in contact with the component. The transition extends between and is integrally formed with the pair of legs. The tab is connected to and extends away from the plane of one of the pair of legs. The tab also engages and is semi-permanently attached to the component.

BRIEF DESCRIPTION OF THE SEVERAL VIEWS OF THE DRAWINGS

The exemplary embodiment of the present invention, illustrative of the best mode in which Applicant has contemplated applying the principles, is set forth in the following description, shown in the drawings, and particularly and distinctly pointed out and set forth in the appended claims.

Similar characters refer to similar parts throughout.

DESCRIPTION OF THE PREFERRED EMBODIMENT

Figure 1:
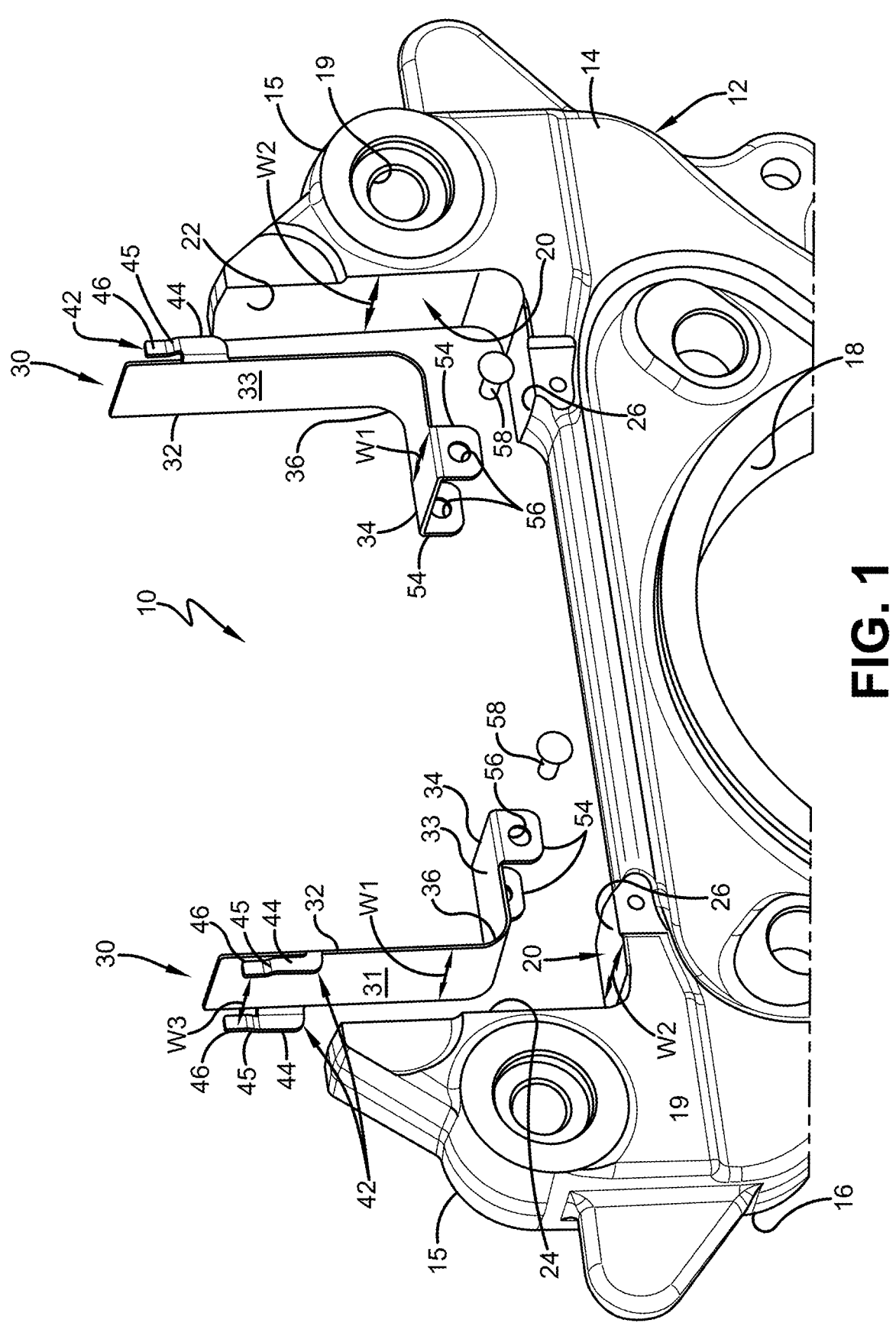
FIG. 1 is a fragmentary perspective view of an exemplary embodiment shim incorporated into a torque plate of a carrier-less disc brake assembly, showing the shim and fasteners separated from the torque plate.
Figure 2:
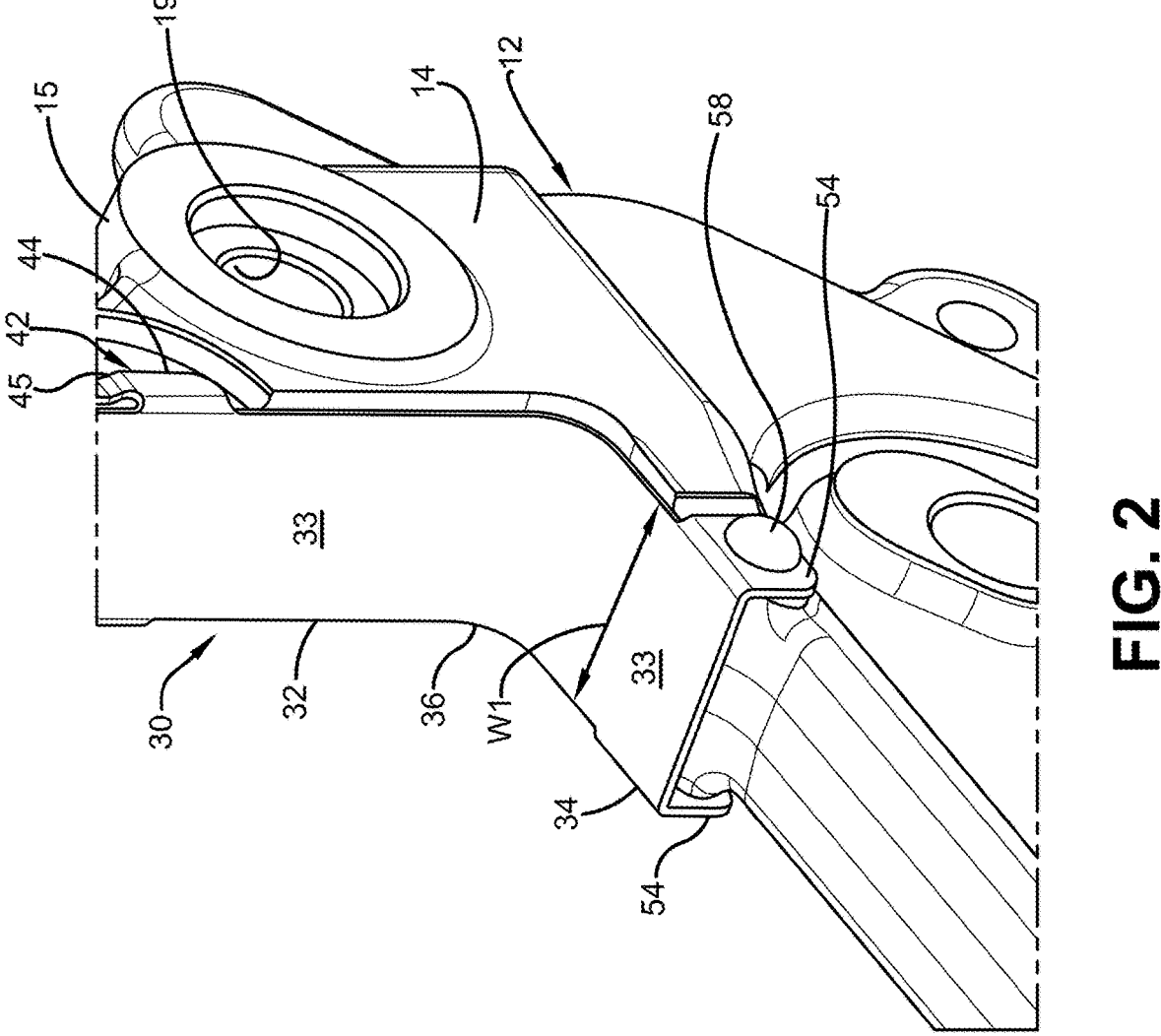
FIG. 2 is an enlarged fragmentary perspective view of the shim shown in FIG. 1, showing the shim installed on the torque plate.

An exemplary embodiment shim 30 (FIGS. 1-3) may be utilized with any suitable carrier of any suitable disc brake assembly (not shown), such as a carrier 70 (FIG. 3), or torque plate of any suitable carrier-less disc brake assembly (not shown), such as a torque plate 10, of a heavy-duty vehicle (not shown).

Torque plate 10 may be of the type utilized with a disc brake assembly lacking a carrier, commonly referred to as carrier-less torque plates. Torque plate 10 is generally formed with a body 12 having an inboard face 14, an outboard face 16, and a bore 18 (partially shown) extending transversely through the torque plate from the inboard face to the outboard face. Bore 18 is disposed about an axle (not shown) of an axle/suspension system (not shown) of the heavy-duty vehicle and is rigidly attached, such as by welds, to the axle along the interface between the bore and the axle, as is known. Body 12 is also formed with a pair of longitudinally-spaced mounting arms 15 that extend within the plane of torque plate 10 and in a direction away from bore 18. Each mounting arm 15 includes a respective opening 19 extending transversely through the mounting arm for attaching a guide pin assembly (not shown).

Torque plate 10 also includes a pad seat 20 formed and extending longitudinally between mounting arms 15 for receiving one of a pair of brake pads (not shown) of the disc brake assembly, as is known. In particular, pad seat 20 includes a leading abutment 22, a trailing abutment 24 (partially shown), and a pair of longitudinally-spaced radial abutments 26. More particularly, leading and trailing abutments 22, 24, respectively, are formed along a respective one of mounting arms 15 such that the leading and trailing abutments are in opposition and separated by a longitudinal distance.

In accordance with an important aspect of the present invention, leading and trailing abutments 22, 24, respectively, are engaged by respective mirror-image shims 30. Because shims 30 are mirror-images of each other, and for the sake of clarity and conciseness, only one of the shims will be described below. Shim 30 is generally formed of any suitable material, such as metal, using any suitable process, such as stamping. Shim 30 may be generally L-shaped, or any other suitable shape, and includes a lateral leg 32 and a longitudinal leg 34 extending in different directions away from and separated by a transition 36. Shim 30 also includes an inner surface 31 and an outer surface 33 that extend along lateral leg 32, transition 36, and longitudinal leg 34. Transition 36 may have any suitable angle or radius curvature and generally corresponds to the shape of pad seat 20 and/or the brake pad in order to minimize movement and vibration between torque plate 10, shims 30, and the brake pad. More specifically, it is contemplated that transition 36 has an angle or curvature that allows lateral leg 32 to extend generally perpendicularly relative to longitudinal leg 34. Both lateral and longitudinal legs 32, 34, respectively, have a width or dimension W1 extending transversely across shim 30 that generally corresponds and is equivalent to or slightly-less than a width or dimension W2 extending transversely between the inboard and outboard faces of torque plate 10 across leading, trailing, and radial abutments 22, 24, 26, respectively, of pad seat 20.

In accordance with another important aspect of the present invention, lateral leg 32 of exemplary embodiment shim 30 mechanically engages inboard and outboard faces 14, 16, respectively, of torque plate 10. In particular, lateral leg 32 may be disposed within pad seat 20 such that inner surface 31 abuts leading or trailing abutment 22, 24, respectively, of the pad seat and the lateral leg extends in the same direction as mounting arm 15. Lateral leg 32 includes a pair of transversely-symmetrical tabs 42 extending perpendicularly-away from opposite sides of the lateral leg toward mounting arm 15. Each tab 42 is disposed adjacent to and mechanically engages one of inboard and outboard face 14, 16, respectively, of mounting arm 15. More, particularly, tabs 42 include a respective body 44 and a projection 46 that extends from the body. Body 44 of each tab 42 is connected to or integrally-formed with lateral leg 32 and may have a generally rectangular shape or any other suitable shape. Each projection 46 extends from the respective body 44 and away from transition 36 in parallel with lateral leg 32. Projections 46 each include a flexible, oblique bend or pleat 45 formed between body 44 and the projection. Pleats 45 of respective projections 46 are formed such that the projections are offset from or disposed out-of-plane relative to the respective bodies 44 and relatively closer than the bodies to inboard and outboard faces 14, 16, respectively. More specifically, a width or dimension W3 extending between opposing projections 46 of lateral leg 32 may be less than dimension W1 of the lateral leg and may be less than dimension W2 of leading, trailing, and radial abutments 22, 24, 26, respectively, of pad seat 20. As a result, pleats 45 provide a resilient compression or clamping force between opposing projections 46 that allows shims 30 to slide onto mounting arm 15 of torque plate 10 and to at least partially resist dislodgement during installation.

In accordance with yet another important aspect of the present invention, longitudinal leg 34 of exemplary embodiment shim 30 is semi-permanently attached to torque plate 10. In particular, longitudinal leg 34 may be disposed within pad seat 20 such that inner surface 31 of the longitudinal leg is in contact with and extends along radial abutment 26 of the pad seat. Longitudinal leg 34 includes a pair of transversely-symmetrical tabs 54 extending perpendicularly from opposite sides of the longitudinal leg toward body 12. Tabs 54 are connected to or integrally-formed with longitudinal leg 34 and disposed adjacent to and mechanically engage with one of inboard and outboard faces 14, 16, respectively, of torque plate 10. More particularly, each tab 54 is formed with an opening 56 extending through the tab for semi-permanently attaching shim 30 to body 12 of torque plate 10. It is contemplated that openings 56 of respective tabs 54 may be transversely aligned or may be askew relative to each other and may correspond to the structure or other features of torque plate 10. It is also contemplated that each opening 56 may be any suitable shape, such as round, elongate, or slot-like, to reduce the accuracy needed for semi-permanent attachment of shim 30 to torque plate 10. Openings 56 receive respective fasteners 58, such as rivets, screw nails, or the like, to semi-permanently attach shim 30 to torque plate 10. More specifically, fasteners 58 may be any suitable type of fastener that can only be removed using an intentional, destructive, mechanical process, such as grinding or cutting. As a result, shim 30 is more likely than prior art shims to not be unintentionally omitted during installation or maintenance or easily dislodged under normal wear conditions because the shims are semi-permanently attached to torque plate 10.

Furthermore, semi-permanent attachment of shim 30 to body 12 of torque plate 10 using fasteners 58 is more likely to prevent omission of the shim during routine maintenance of the disc brake assembly than prior art shims and provides assistance in potential failure investigations. In particular, because shim 30 can only be removed using an intentional, destructive, mechanical process, such as grinding or cutting, removal of or tampering with the shim may create a hallmark or "witness mark" indicative of interference with the brake assembly. As a result, investigations of potential failures of components of the brake assembly are able to determine if shim 30 was removed intentionally, potentially reducing the cost of maintenance and replacement.

Figure 3:
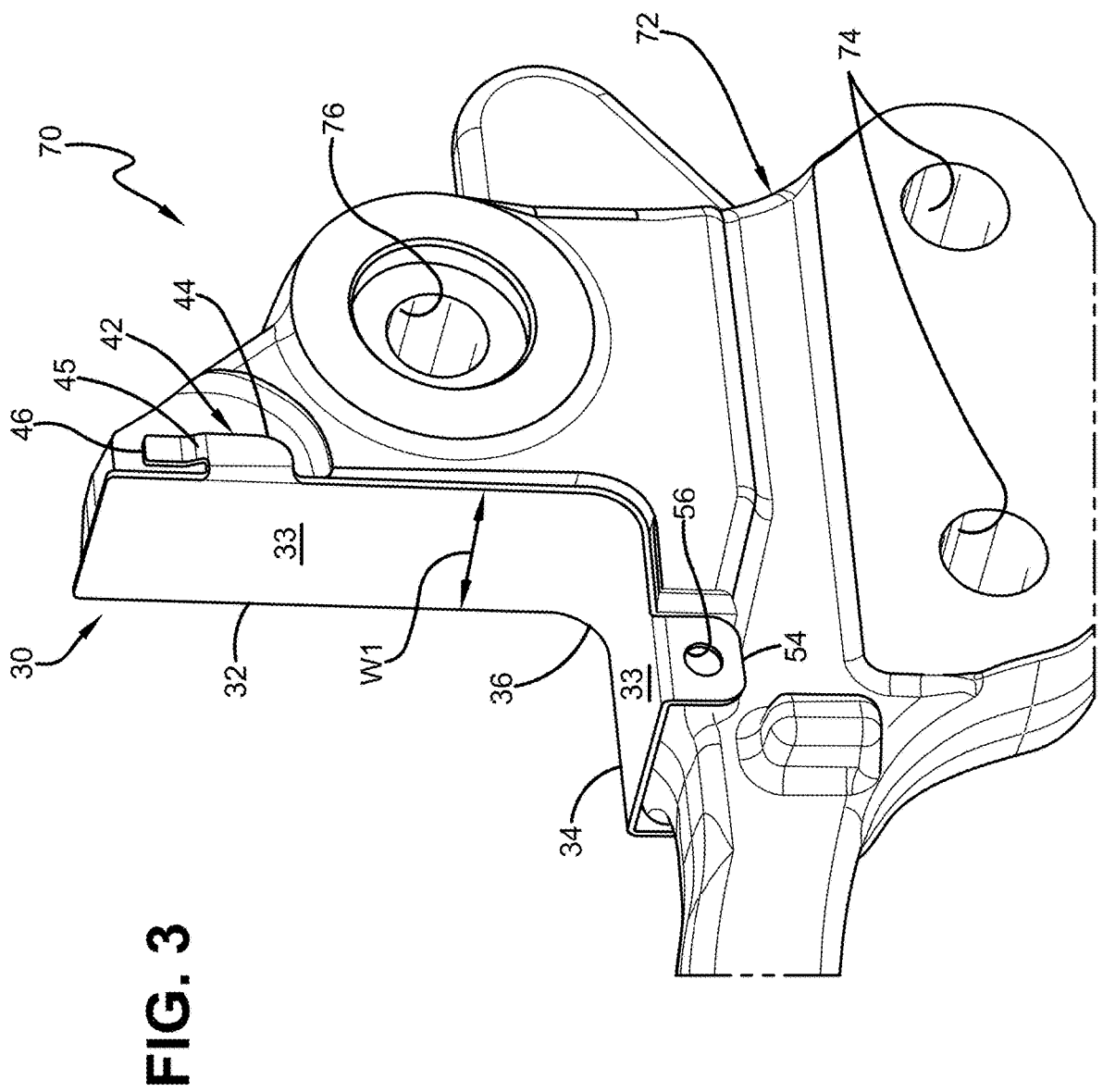
FIG. 3 is an enlarged fragmentary perspective view of the exemplary embodiment shim incorporated into a carrier of a disc brake assembly, showing the shim installed on the carrier.

In the alternative, and with particular reference to FIG. 3, shim 30 may be installed on carrier 70 of a traditional disc brake assembly (not shown). In particular, carrier 70 includes an inboard portion 72 (partially shown), an outboard portion (not shown), and a pair of longitudinally separated bridge arms (not shown) connecting the inboard and outboard portions. Inboard portion 72 includes a set of openings 74 for receiving fasteners (not shown), such as bolts, for mounting carrier 70 to a traditional torque plate (not shown). Inboard portion 72 also includes a pair of openings 76 (only one shown) for attaching guide pin assemblies (not shown) for slidably mounting a caliper (not shown), as is known. A pad seat (not indicated) is formed in inboard portion 72 for receiving one of a pair of brake pads of the disc brake assembly. More particularly, shim 30 may be disposed within the pad seat and semi-permanently attached to inboard portion 72 of carrier 70 in a manner similar to that of torque plate 10, described above.

During installation, shims 30 may be disposed within pad seat 20 and mechanically engage body 12 of torque plate 10. More particularly, inner surface 31 of lateral legs 32 of shims 30 are partially disposed against leading or trailing abutment 22, 24, respectively, of pad seat 20 and slid along mounting arms 15 toward bore 18. Shims 30 are slid along leading or trailing abutment 22, 24, respectively, of pad seat 20 until longitudinal legs 34 contact radial abutment 26 of the pad seat such that projections 46 of tabs 42 of lateral legs 32 mechanically engage inboard and outboard faces 14, 16, respectively, of mounting arms 15 and tabs 54 of the longitudinal legs are disposed adjacent the inboard and outboard faces of body 12. Pleats 45 enable projections 46 to mechanically engage inboard and outboard faces 14, 16, respectively, between the projections through compression or clamping. Fasteners 58 are inserted into openings 56 of longitudinal legs 34 and semi-permanently attach the shims 30 to body 12 of torque plate 10. Torque plate 10 is then disposed about the central tube of the axle and attached using any suitable method, such as welding. Once assembly of the disc brake assembly is complete, the brake pad is inserted into pad seat 20 such that portions of the brake pad abut outer surface 33 of at least one of lateral leg 32, transition 36, and longitudinal leg 34 of each shim 30. It is also contemplated that shims 30 may be installed in a similar manner on inboard portion 72 of carrier 70 after the carrier is mounted to a suitable torque plate and before mounting the caliper to the carrier.

During operation of the heavy-duty vehicle, when the disc brake assembly is engaged, the brake pad contacts a rotor (not shown) of the brake assembly. Contact of the brake pad against the rotor slows and/or stops the heavy-duty vehicle and generates forces, such as torque, that act on the brake pad. This torque pushes the brake pad against lateral legs 32 of shims 30, transmitting the torque through the shims to torque plate 10 or carrier 70. Because shim 30 is disposed between the brake pad and pad seat 20, the shim acts as a sacrificial interface, reducing or preventing wear of torque plate 10 or carrier 70 that typically results from movement of and interaction between the brake pad and the torque plate or carrier, increasing the service-life of the torque plate or carrier and reducing the cost of maintenance and replacement.

Thus, exemplary embodiment shim 30, according to the present invention, is disposed between the brake pad and leading and trailing abutments 22, 24, respectively, to reduce or eliminate fretting and/or wear of torque plate 10 in a carrier-less system, or carrier 70, thereby increasing the service-life and reducing the cost of maintenance and replacement of components of the disc brake assembly. In addition, shim 30 is semi-permanently attached to torque plate 10 by fasteners 58 that can only be removed through an intentional process, such as grinding or cutting, resulting in a witness mark that provides an indication of tampering and/or interference with the disc brake assembly. Moreover, semi-permanent attachment of shim 30 to torque plate 10, in a carrier-less disc brake assembly also reduces the possibility that the shim may become dislodged during operation of the disc brake assembly.

It is to be understood that exemplary embodiment shim 30, according to the present invention, may be utilized in connection with disc brake assemblies other than those shown and described above, including those with or without carriers, without affecting the overall concept or operation of the present invention. It is further to be understood that shim 30, may be formed from any suitable material or combination of materials using any suitable methods without affecting the overall concept or operation of the invention.

The present invention has been described with reference to a specific exemplary embodiment. This illustration is by way of example and not by way of limitation. Potential modifications and alterations will occur to others upon a reading and understanding of this disclosure, and it is understood that the invention includes all such modifications, alterations, and equivalents. In the foregoing description, certain terms have been used for brevity, clarity, and understanding, but no unnecessary limitations are to be implied therefrom beyond the requirements of the prior art because such terms are used for descriptive purposes and are intended to be broadly construed.

Accordingly, the shim of the present invention is simplified; provides an effective, safe, inexpensive, and efficient structure and method that achieve all the enumerated objectives; provides for eliminating difficulties encountered with prior art shims; and solves problems and obtains new results in the art.

Having now described the features, discoveries, and principles of the invention; the manner in which the shim is used and installed; the characteristics of the construction, arrangement, and method steps; and the advantageous, new and useful results obtained, the new and useful structures, devices, elements, arrangements, process, parts, and combinations are set forth in the appended claims.

What is claimed is:

1. A shim for use with a component of a heavy-duty vehicle disc brake system, said shim comprising:

a pair of legs disposed upon and in contact with said component of said heavy-duty vehicle disc brake system;

a transition extending between and integrally formed with said pair of legs; and at least one tab connected to and extending away from the plane of one of the pair of legs;

wherein said at least one tab engages and is semi-permanently attached by fasteners to an inboard and outboard face of a body of the component;

and wherein tampering and removal of said shim creates a physical hallmark on each one of said inboard and outboard faces of said body of the component of said heavy-duty vehicle disc brake system that is indicative of deliberate removal of the shim.

2. The shim according to claim 1, wherein semi-permanent attachment of said at least one tab to said component prevents tampering and removal of said shim except by a deliberate, destructive, mechanical process.

3. The shim according to claim 2, wherein said deliberate, destructive, mechanical process is chosen from a group consisting of cutting and grinding.

4. The shim according to claim 1, said pair of legs further comprising a transverse width corresponding to a transverse dimension of said component of said heavy-duty vehicle disc brake system.

5. The shim according to claim 1, wherein said shim supports a portion of a brake pad disposed thereon to reduce fretting and wear of said component of said heavy-duty vehicle disc brake system.

6. The shim according to claim 1, said fasteners further comprising a rivet or screw nail.

7. The shim according to claim 1, said transition further comprising a radius curvature corresponding to a shape of one of said component of said heavy-duty vehicle disc brake system and a brake pad.

8. The shim according to claim 7, each one of said pair of legs extending perpendicularly away from the other.

9. The shim according to claim 1, said component further comprising a torque plate or brake carrier.

10. A shim for use with a component of a heavy-duty vehicle disc brake system, said shim comprising:

a pair of legs disposed upon and in contact with said component of said heavy-duty vehicle disc brake system;

a transition extending between and integrally formed with said pair of legs; and at least one tab connected to and extending away from the plane of one of the pair of legs;

wherein said at least one tab engages and is semi-permanently attached by fasteners to an inboard and outboard face of a body of the component;

and wherein semi-permanent attachment prevents tampering and removal except by a deliberate, destructive, mechanical process chosen from a group consisting of cutting and grinding.

* * * * *